(12) United States Patent
Pavlinsky et al.

(10) Patent No.: US 8,858,270 B2
(45) Date of Patent: Oct. 14, 2014

(54) RECHARGEABLE BATTERY PACK INCLUDING LOW-RESISTANCE BATTERY-PACK INTERCONNECT

(75) Inventors: Robert J. Pavlinsky, Oxford, CT (US); Mark Curtis Brown, Brookfield, CT (US); Anthony Joseph Malgioglio, Stamford, CT (US)

(73) Assignee: The Gillette Company, Boston, MA (US)

( * ) Notice: Subject to any disclaimer, the term of this patent is extended or adjusted under 35 U.S.C. 154(b) by 725 days.

(21) Appl. No.: 13/013,642

(22) Filed: Jan. 25, 2011

(65) Prior Publication Data

US 2012/0190252 A1    Jul. 26, 2012

(51) Int. Cl.
*H01R 4/28* (2006.01)
*H01M 10/42* (2006.01)
*H01M 2/22* (2006.01)
*H01M 2/10* (2006.01)

(52) U.S. Cl.
CPC .............. *H01M 10/425* (2013.01); *H01M 2/22* (2013.01); *H01M 2/1061* (2013.01)
USPC ........... 439/775; 439/783; 439/863; 361/759; 361/760; 429/123; 429/149; 429/156

(58) Field of Classification Search
USPC .......... 429/123, 149, 156; 439/775, 783, 807, 439/863; 361/749, 759, 760, 775
See application file for complete search history.

(56) References Cited

U.S. PATENT DOCUMENTS

| | | | |
|---|---|---|---|
| 5,509,814 A | | 4/1996 | Mosquera |
| 5,796,588 A | * | 8/1998 | Machida et al. ............... 361/773 |
| 5,999,410 A | * | 12/1999 | Weiler ........................... 361/749 |
| 8,273,476 B2 | * | 9/2012 | Lee ................................ 429/185 |
| 8,398,412 B2 | * | 3/2013 | Dolhagaray et al. ......... 439/76.1 |
| 2004/0137786 A1 | | 7/2004 | Yu |
| 2005/0019654 A1 | | 1/2005 | Kishida |
| 2010/0159287 A1 | * | 6/2010 | Kwag et al. ........................ 429/7 |
| 2010/0323442 A1 | * | 12/2010 | Baetge et al. ................. 435/375 |
| 2011/0117392 A1 | * | 5/2011 | Kim .................................. 429/7 |

FOREIGN PATENT DOCUMENTS

| | | |
|---|---|---|
| DE | 19810746 | 9/1999 |
| DE | 102009036086 | 2/2001 |
| DE | 102008002969 | 2/2010 |
| WO | WO 2010106027 A1 * | 9/2010 |

OTHER PUBLICATIONS

International Search Report mail date Mar. 3, 2012. 4 pages.

* cited by examiner

*Primary Examiner* — Carlos Barcena
(74) *Attorney, Agent, or Firm* — Leo J. White; Kevin C. Johnson; Steven W. Miller

(57) ABSTRACT

A battery pack comprising: at least one battery including at least one electrode and at least one terminal in electrical connection with the electrode; a printed circuit board (PCB) comprising at least one layer having an electrical circuit in electrical connection with the at least one battery, the PCB including at least one PCB interconnect for electrical connection with the at least one battery; and at least one battery-pack interconnect in electrical connection with the at least one PCB interconnect and the at least one terminal of the battery. The PCB interconnect comprises a PCB-interconnect aperture formed therein and having an electrically conductive inner surface structured to receive the battery-pack interconnect for direct electrical connection between the two.

20 Claims, 10 Drawing Sheets

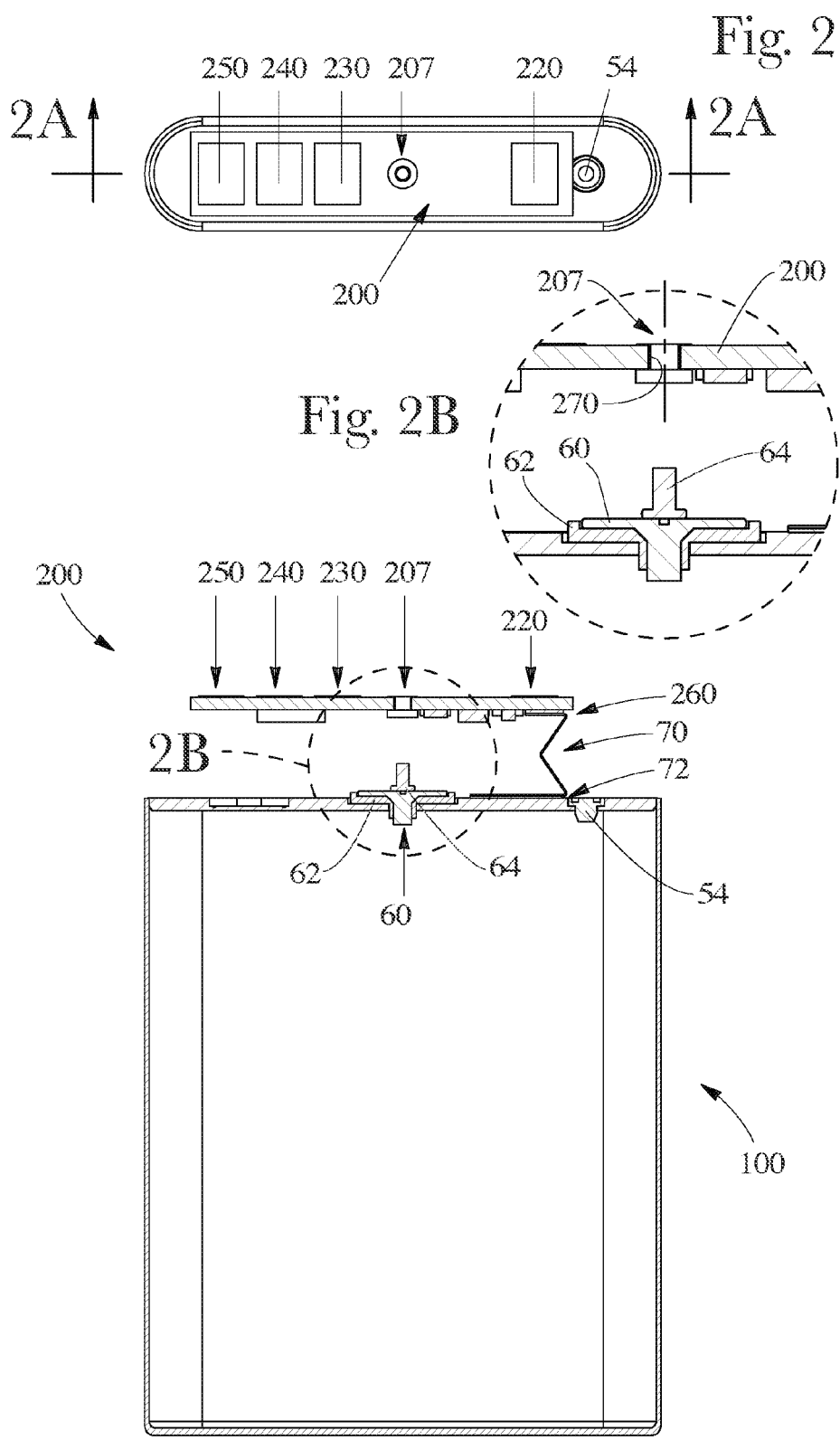

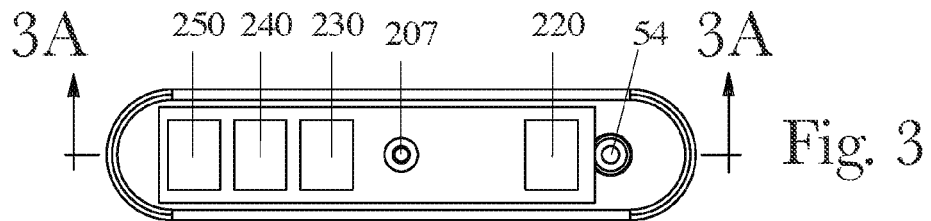
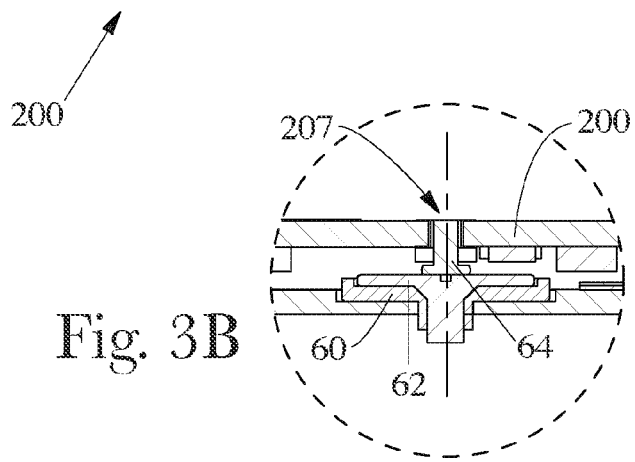
Fig. 3B
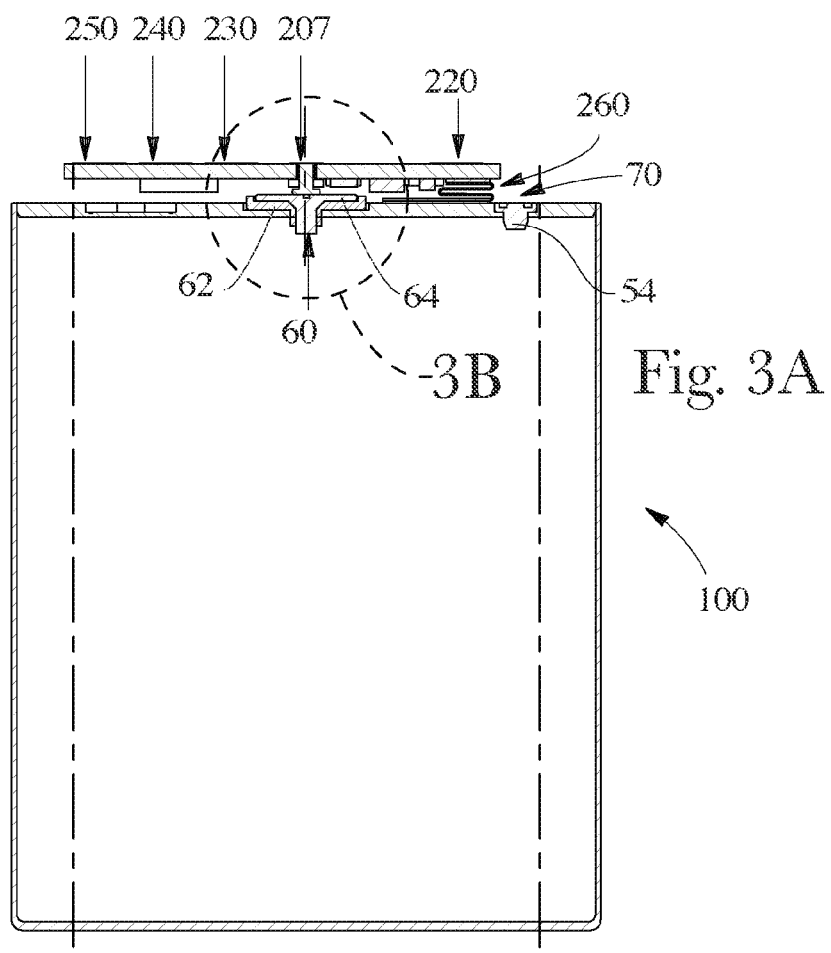
Fig. 3A

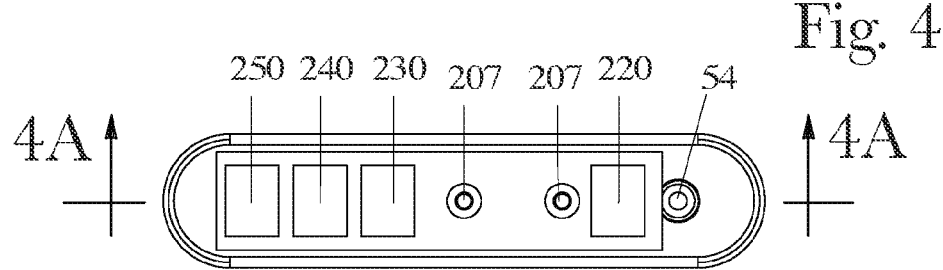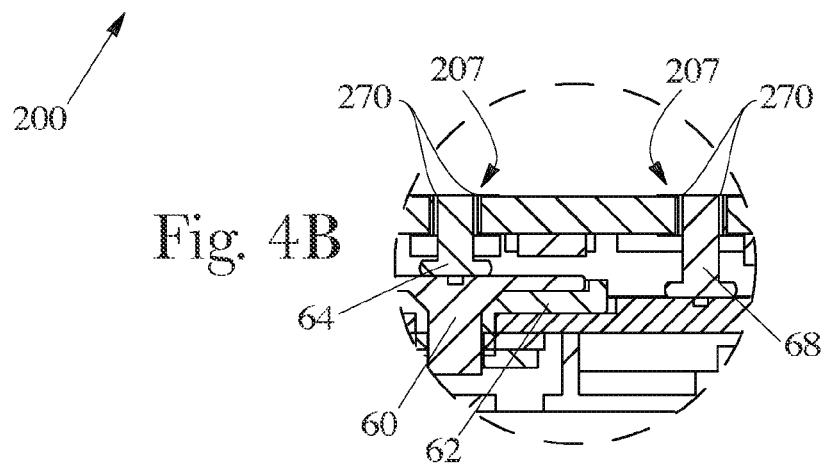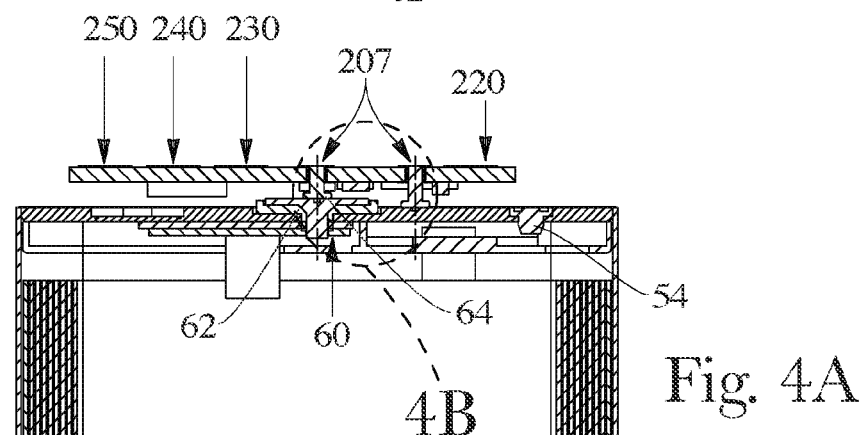

RECHARGEABLE BATTERY PACK INCLUDING LOW-RESISTANCE BATTERY-PACK INTERCONNECT

FIELD OF THE INVENTION

This invention relates to battery packs. More particularly the invention relates to a battery pack utilizing at least one low-resistance interconnect between a printed circuit board (PCB) and a rechargeable cell, both within the battery pack.

BACKGROUND OF THE INVENTION

Batteries are commonly used today to power portable electronic devices, such as mobile phones, notebook computers, camcorders, digital cameras, digital audio players, and the like. Rechargeable (or "secondary") cells, i.e., those that can be discharged and then charged again to provide repeated use thereof, are conveniently employed in portable electronic devices. This "rechargeability" feature often makes a rechargeable battery a more attractive choice than a disposable (or "primary") battery, i.e., a battery that is designed to be discarded after a single discharge.

A conventional rechargeable battery, such as, for example, a lithium-ion battery, typically includes an electrode assembly comprising a positive electrode, a negative electrode, a separator therebetween, and an electrolyte, all disposed in a housing having a closure. The housing may be electrically connected to a printed circuit board (PCB), which, in turn, may include electronic components capable of preventing overcharge or discharge, monitoring battery discharge characteristics, providing battery identification to either the device or charger, and so forth. The PCB typically includes circuitry that forms an electric path between the housing and an external device when the cell is charging or discharging. Tabs can be welded in electrical connection with the electrodes of the battery. The tabs generally add complexity to the design of the battery and to the manufacturing process, and may be a source of increased electrical resistance in the finished battery.

There is a need to provide a battery pack capable of meeting the increased power demands of the rapidly developing a growing market of portable electronic devices. Hence, we have invented a low-resistance battery-pack interconnect that minimizes resistance losses to enable more effective and efficient charge and discharge of a rechargeable battery within the pack. Our invention, we believe, will improve charge-and-discharge characteristics of the rechargeable battery. Furthermore, the invention may lead to less complex manufacturing processes resulting in increased production rate and efficiency.

SUMMARY OF THE INVENTION

In one aspect, the present invention is directed to a battery pack comprising at least one rechargeable battery. The battery has at least one electrode and at least one terminal in electrical connection with the at least one electrode. The at least one terminal may comprise a cell contact in electrical connection with a cell-contact plate, wherein the cell-contact plate is in electrical connection with the at least one electrode of the battery.

The battery pack further includes a printed circuit board (PCB) comprising at least one layer having an electrical circuit in electrical connection with the battery. The PCB includes a PCB interconnect comprising a PCB-interconnect aperture. The PCB-interconnect aperture has an inner surface that is electrically conductive and can be electrically coupled to at least one layer of the PCB. The internal conductive surface of the PCB-interconnect aperture can be coated with any suitable conductive material having suitable plating and conductivity characteristics, such as, for example, nickel, gold, copper, conductive alloys, and the like. The conductive material may be applied to the internal surface by any suitable means known in the art, for example, using plating, physical vapor deposition, and the like.

The battery pack includes at least one battery-pack interconnect that is electrically coupled with at least one terminal of the battery. The battery-pack interconnect is structured and configured to be in direct electrical connection with the PCB interconnect. This can be accomplished by structuring and configuring the PCB-interconnect aperture and the battery-pack interconnect so that the former can receive the latter therein for a secure electrical connection therebetween, thereby providing direct electrical connection between the PCB and the battery-pack interconnect.

This direct electrical connection between the PCB interconnect and the battery-pack interconnect can be formed by simple conductive connection that uses mechanical friction taking place between the outer surface of the battery-pack interconnect and inner surface of the PCB-interconnect aperture. The battery-pack interconnect, for example, may comprise a pin, or rivet, which, upon insertion into the PCB-interconnect aperture, tightly fits within the aperture having electrically conductive inner surface, providing thereby a secure direct electrical connection between the batter-pack interconnect and the PCB. The pin may have any suitable shape or construction. For example, the pin may have cylindrical, conical, prismatic, or pyramidal outer surface, to fit inside a corresponding inner surface of the PCB-interconnect aperture. A split or hollow pin, or a combination thereof, may also be used. In addition, a wedge inserted in a split or hollow opening of the pin may be employed to secure the pin inside the PCB-interconnect aperture.

Alternatively or additionally, the direct electrical connection between the PCB interconnect and the battery-pack interconnect can be formed by soldering, welding, fusion welding, electrical-resistance welding, laser welding, ultrasonic welding, and the like, to affix the outer surface of the battery-pack interconnect to the inner surface of the PCB-interconnect aperture. Conductive gluing, using any suitable electrically conductive adhesive, may be used as well. The above examples of fixing or attaching the battery-pack interconnect inside the PCB-interconnect aperture should be interpreted as mere examples. The above types of electrical connection between the PCB interconnect and the battery-pack interconnect are believed to provide a secure low-resistance electrical connection therebetween. Other secure-connection configurations such as, for example, various so-called snap-on (or snap-in) designs, alone or in combination with the above, can be used.

One skilled in the art would appreciate that any other means of securing the direct electrical connection between the PCB interconnect and the battery-pack interconnect is within the scope of the invention. Likewise, the battery-pack interconnect may be affixed to the at least one terminal of the battery by, for example, soldering, welding, fusion welding, electrical resistance welding, laser welding, ultrasonic welding, or conductive adhesive.

The battery-pack interconnect may comprise a single integral structure. In the embodiment of the battery-pack interconnect comprising a rivet, the pin may be affixed to a cell contact or a cell-contact plate by any means known in the art, including, without limitation, soldering, welding, fusion welding, electrical resistance welding, laser welding, ultrasonic welding, or conductive adhesive.

The battery-pack interconnect may comprise any suitable electro-conductive material, including, for example, nickel, nickel-plated steel, copper, copper-plated steel, aluminum, aluminum-plated steel, and any mixture thereof.

The battery pack of the present invention may have a plurality of PCB interconnects—and correspondingly a plurality of battery-pack interconnects. In one embodiment, for example, there are two PCB interconnects and two corresponding battery-pack interconnects.

In another aspect, the invention is directed to a printed circuit board (PCB) for a battery pack including at least one rechargeable battery and comprising a battery-pack interconnect for direct electrical connection with the PCB, wherein the PCB comprises at least one layer and at least one PCB-interconnect aperture having an electrically conductive inner surface that is electrically coupled to the at least one layer of the PCB. The PCB-interconnect aperture is structured and configured to receive the battery-pack interconnect therein for direct electrical connection between the PCB and the battery-pack interconnect. The electrically conductive inner surface of the PCB-interconnect aperture can be formed by using any suitable electrically conductive coating material, for example, a conductive material selected from the group consisting of nickel, gold, copper, conductive alloys, and any combination thereof.

BRIEF DESCRIPTION OF THE DRAWINGS

FIG. 2 is a schematic plan view of the embodiment shown in FIG. 1.

FIG. 2A is a schematic front view of the embodiment shown in FIG. 1.

FIG. 2B is a partial schematic view of the embodiment shown in FIG. 2A.

FIG. 3 is a schematic plan view of an embodiment similar to that shown in FIG. 2.

FIG. 3A is a schematic front view of the embodiment shown in FIG. 3.

FIG. 3B is a partial schematic view of the embodiment shown in FIG. 3A.

FIG. 4 is a schematic plan view of an embodiment a battery pack of the present invention, comprising a rechargeable battery, a printed circuit board (PCB), and a low-resistance battery-pack interconnect, wherein PCB includes two interconnect apertures.

FIG. 4A is a schematic front view of the embodiment shown in FIG. 4.

FIG. 4B is a partial schematic view of the embodiment shown in FIG. 4A.

DETAILED DESCRIPTION OF THE INVENTION

Figure 1:
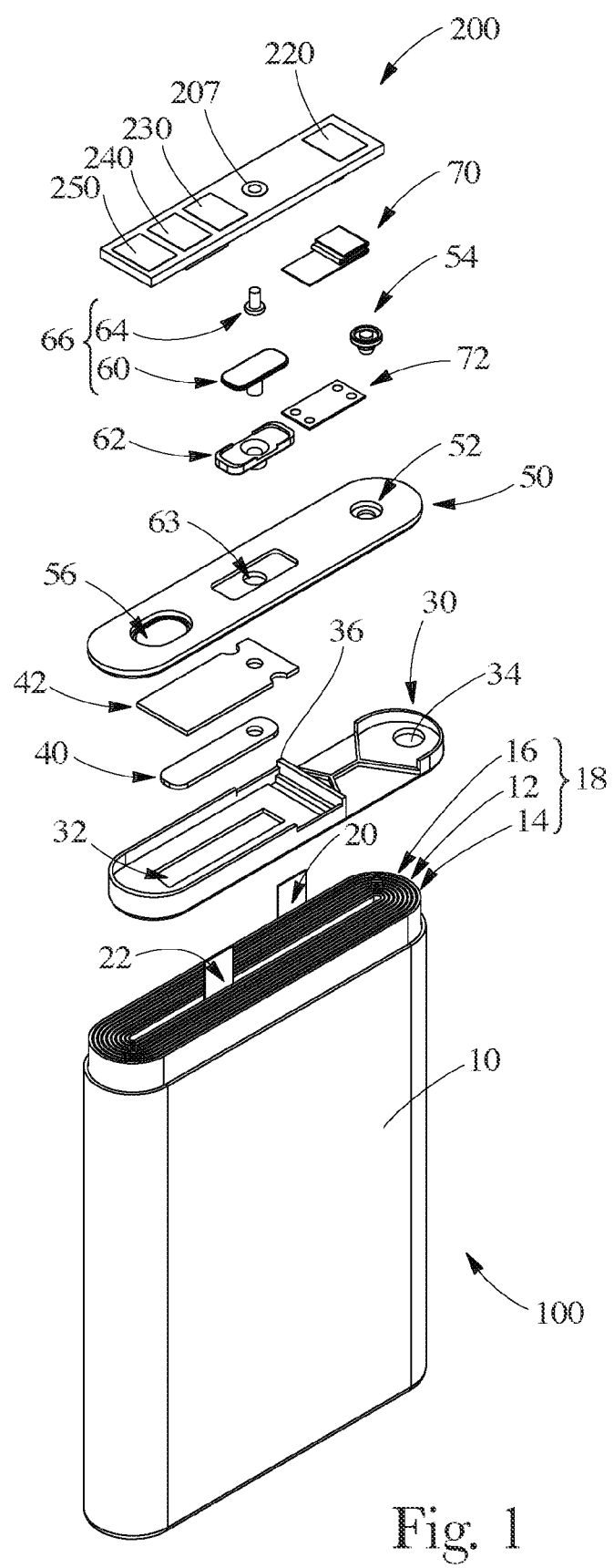
FIG. 1 is a schematic perspective view of an embodiment of a battery pack of the present invention, comprising a rechargeable battery, a printed circuit board (PCB), and a low-resistance battery-pack interconnect, wherein PCB includes one interconnect aperture.
Figure 5A:
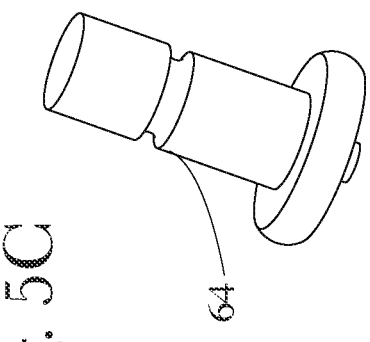
FIG. 5A is a perspective schematic view of a hollow split pin that can be used in the battery-pack interconnect of the invention.
Figure 5B:
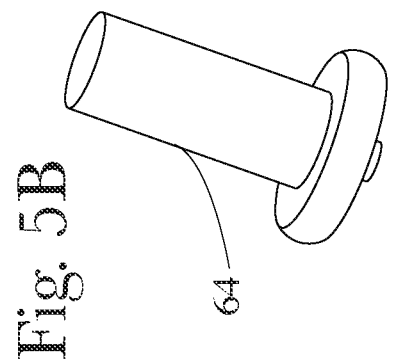
FIG. 5B is a perspective schematic view of a solid pin that can be used in the battery-pack interconnect of the invention.
Figure 5D:
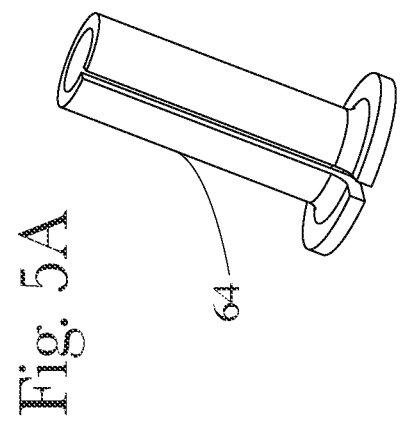
FIG. 5D is a perspective schematic view of a slotted pin that can be used in the battery-pack interconnect of the invention.
Figure 5C:
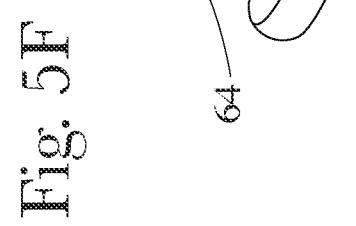
FIG. 5C is a perspective schematic view of a grooved pin that can be used in the battery-pack interconnect of the invention.
Figure 5E:
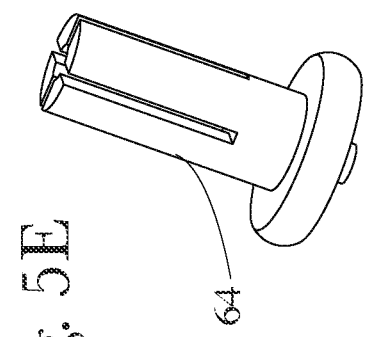
FIG. 5E is a perspective schematic view of a double-slotted pin with a central hole that can be used in the battery-pack interconnect of the invention.
Figure 5F:
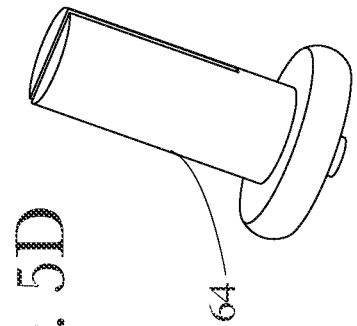
FIG. 5F is a perspective schematic view of a double-slotted pin with an angled lock that can be used in the battery-pack interconnect of the invention.

In an embodiment of the battery pack shown in FIG. 1, a rechargeable battery 100 is electrically connected to a printed circuit board (PCB) 200, via at least one low-resistance battery-pack interconnect 66.

The battery 100 includes a first electrode 12, a second electrode 16, a separator 14 disposed between the electrodes 12, 16, and an electrolyte (typically including at least one salt dissolved in at least one organic solvent), all disposed within a housing 10. The electrodes 12, 16 and the separator 14 form an electrode assembly 18 that may be configured to form any suitable structure or shape, such as, for example, a stacked electrode assembly or rolled electrode assembly, the latter being conventionally referred to as a "jellyroll" configuration and shown in FIG. 1. For convenience, the first electrode 12 may be herein referred to as the positive electrode and the second electrode 16 as the negative electrode. However, the polarity of the electrodes 12, 16 may switch depending on the charged or discharged state of the battery 100. Furthermore, the design of the device to be powered by the battery 100 may require that the polarity of the electrodes 12, 16 be adjusted in order to power the device.

The electrodes 12, 16 may be formed by any means known in the art. The positive electrode 12, for example, may be formed by applying a positive active material to a positive electrode current collector composed of, for example, aluminum or the like. The negative electrode 16 may be formed, for example, by applying a negative active material to a negative electrode current collector composed of, for example, aluminum, copper, or the like. Either electrode 12, 16 may include a portion that includes electrode active material and a portion that does not include electrode active material. The area void of active material may be referred to as a "mass-free zone," or MFZ.

A first electrode tab 20 may be electrically connected to the first electrode 12 and a housing closure 50, by being attached, for example, to the MFZ of the positive electrode 12 to carry current. The housing closure 50 in this electrical configuration may be referred to as a first terminal of the battery 100. A second electrode tab 22 may be electrically connected to the second electrode 16 and a cell contact plate 40, by being attached, for example, to the MFZ of the negative electrode to carry current. The first electrode tab 20 may be referred to as the positive electrode tab and the second electrode tab 22 may be referred to as the negative electrode tab.

The electrode tabs may be made of any suitable material, for example, nickel, and may be attached to the MFZ of the respective electrode by any means known in the art, for example, welding, soldering, and the like. Examples of welding techniques include, without limitation, ultrasonic welding, laser welding, fusion welding, and electrical resistance welding. The electrode tabs may also comprise integral components of the respective current collectors. The MFZ may be blanked or cut-away from a coated electrode current collector. The positive electrode tab 20 may be attached to the housing closure 50, and the negative electrode tab 22 may be attached to the cell-contact plate 40, by, for example, welding (examples of which are listed above), soldering, adhering with conductive glue, and the like. An insulating tape (not shown) may be wound around each of the positive electrode tab 20 and the negative electrode tab 22 at boundaries where the electrode tabs may be drawn outwardly from the jellyroll electrode assembly 18, to prevent a short circuit between the first and second electrodes 12, 16.

The separator 14, interposed between the electrodes 12, 16 to prevent a short circuit therebetween, may be formed of any suitable material, for example, a thermoplastic resin. Examples of suitable separator materials include, without limitation, microporous extruded or cast films, or membranes. The separator 14 may comprise, without limitation, polypropylene, polyethylene, polyvinylidene, and the like materials.

The housing 10 of the battery 100 may be composed of any suitable material, such as any suitable metal. The housing 10 may be formed of a flexible metal, for example, aluminum, an aluminum alloy, stainless steel, nickel-plated steel (pre or post-plated), or the like. The housing 10 may have a suitable volumetric structure with an open top, for example, and it may have a prismatic shape, a cylindrical shape, an oval shape and so forth, comprise a polygonal structure with rounded edges, or any other suitable shape. The housing 10 should have sufficient dimensions to include the electrode assembly 18, the electrolyte, and a stack insulator 30 positioned on the electrode assembly 18. The housing closure 50 is attached to the open top of the housing 10 to seal the electrode assembly 18 inside the housing 10. The housing closure 50 may include a cell-contact aperture 63 into which a cell contact 60 may be inserted, an electrolyte-fill port 52 formed to provide a path for injecting the electrolyte inside the housing, and a vent 56 formed to discharge gas by breaking when the pressure inside the battery 100 increases beyond a certain predetermined threshold level. A fill-port plug 54 may be inserted into the electrolyte fill-port 52 to close it.

A cell-contact insulator 62 may be combined with the cell-contact aperture 63 formed on the housing closure 50. The cell-contact insulator 62 may comprise polypropylene, polyethylene, perfluoroethoxy, and the like materials. The cell-contact insulator 62 may further include an aperture in a center thereof, so the cell contact 60 can fit through the aperture of the cell-contact insulator 62 into the cell-contact aperture 63. The cell contact 60 may penetrate through the housing closure 50 to connect to the cell-contact plate 40. The cell contact 60 in this electrical configuration may be referred to as a second terminal of the battery 100.

A cell-contact-plate insulator 42 may be positioned under the housing closure 50, for example, between the stack insulator 30 and the housing closure 50, and may insulate an outer surface of the cell-contact plate 40. The cell-contact-plate insulator 42 may comprise polypropylene, polyethylene, perfluoroethoxy, and the like materials. The cell-contact-plate insulator 42 may include an aperture therethrough, so the cell contact 60 may penetrate through the cell-contact-plate insulator 42 to connect to the cell-contact plate 40.

The cell-contact plate 40 may be positioned under the cell-contact-plate insulator 42, for example, between the stack insulator 30 and the cell-contact-plate insulator 42. The cell-contact plate 40 may be composed of nickel, nickel-plated steel (pre or post-plated), copper, alloys there of, and the like materials. The cell-contact plate 40 may include a conductive material to facilitate an electrical connection to the second electrode 16, thereby forming an electrical path. A lower surface of the cell-contact plate 40 may be electrically connected to the second electrode tab 22. In this configuration, the battery-pack interconnect 66 may have the same polarity as the second electrode 16.

The stack insulator 30 may be positioned on the electrode assembly 18, for example, between the electrode assembly 18 and the housing closure 50. The stack insulator 30 may comprise polypropylene, polyethylene, perfluoroethoxy, and the like materials. The stack insulator 30 may prevent or substantially minimize movement of the electrode assembly when the battery 100 is assembled. The stack insulator 30 may include a tab groove 36 and a tab aperture 32, which may keep the first electrode tab 20 and the second electrode tab 22 spaced apart from each other by a predetermined distance to prevent a short circuit therebetween, and may guide the first electrode tab 20 and the second electrode tab 22 when the tabs protrude outwardly. The stack insulator 30 may include a fill aperture 34 formed to provide a path through which the electrolyte can be injected into the housing 10.

A cell-contact pin, or pin, 64 may be affixed to the cell contact 60 of the assembled battery 100. The cell-contact pin 64 and the cell contact 60 may be made of nickel, nickel-plated steel (pre or post-plated), copper, copper-plated steel (pre or post-plated), aluminum, aluminum-plated steel (pre or post-plated), alloys thereof, and the like materials. The cell-contact pin 64 and the cell contact 60 may be collectively referred to as the battery-pack interconnect 66. The cell-contact pin 64 may be in electrical connection with the first electrode 12, the second electrode 16, or both electrodes 12, 16 of the assembled battery 100.

FIG. 1 shows a non-limiting example of a prismatic battery pack that includes one cell-contact pin 64 in electrical connection with the second electrode 12 via the cell contact 60 and the cell-contact plate 40. It should be appreciated that the shape of the battery pack may take other forms, such as being of cylindrical design. The cell-contact pin 64 should be made of material that is best suited for bonding between the cell-contact pin 64 and the cell contact 60, the housing 10, or a weld plate 72. A non-limiting example may be that a nickel cell contact 60 may be best combined with a nickel or copper cell-contact pin 64.

The cell-contact pin 64 may comprise any suitable configuration. FIGS. 5A through 12B schematically show several exemplary, non-limiting configurations of the pin 64, alone and in conjunction with the PCB 200 and PCB interconnect 205. FIGS. 5A through 5F shows the battery-pack interconnect 66 comprising, respectively, a hollow split pin, a solid pin, a grooved pin, a slotted pin, a double-slotted pin with a central hole, and a double-slotted pin with an angled lock. The pin 64, with or without split, may be rolled into a tubular shape from a flat sheet material. The solid pin 64 may be forged, turned, or cast.

Figure 6A:
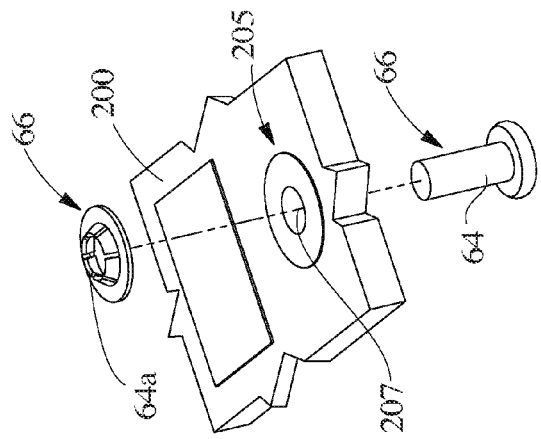
FIG. 6A is a perspective schematic view an embodiment of the battery-pack interconnect comprising a hollow pin in conjunction with a portion of the PCB.
Figure 6B:
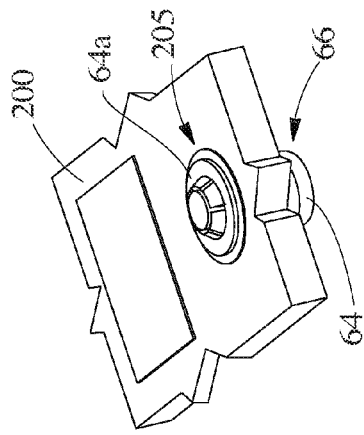
FIG. 6B is a perspective schematic view of the embodiment shown in FIG. 6A, showing the battery-pack interconnect disposed in the PCB interconnect to provide direct electrical connection therebetween.

FIG. 6A shows an embodiment of the battery-pack interconnect 66 comprising the solid or hollow pin 64 in conjunction with a portion of the PCB 200; and FIG. 6B shows the embodiment shown of FIG. 6A, wherein the battery-pack interconnect 66 is disposed in the PCB interconnect 205 to provide direct electrical connection therebetween. The PCB-interconnect aperture 207 may be a through-aperture.

Figure 7A:
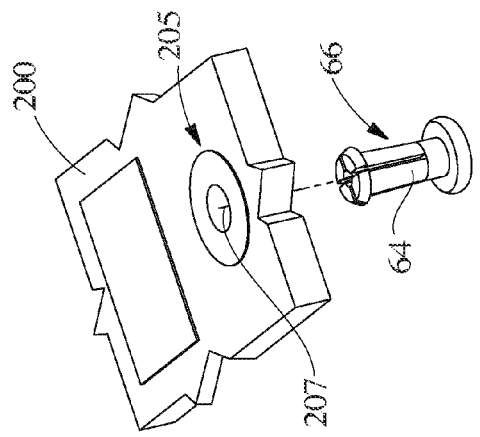
FIG. 7A is a perspective schematic view an embodiment of the battery-pack interconnect comprising a double-slotted pin with an angled lock in conjunction with a portion of the PCB.
Figure 7B:
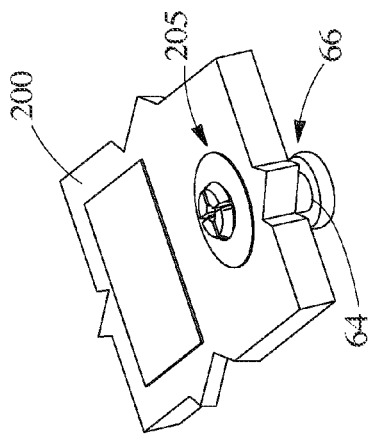
FIG. 7B is a perspective schematic view of the embodiment shown in FIG. 7A, showing the battery-pack interconnect disposed in the PCB interconnect to provide direct electrical connection therebetween.

FIG. 7A shows an embodiment of the battery-pack interconnect 66 comprising a double-slotted pin 64 with an angled lock in conjunction with a portion of the PCB 200; and FIG. 7B shows the embodiment shown in FIG. 7A, wherein the battery-pack interconnect 66 is disposed in the PCB interconnect 205 to provide direct electrical connection therebetween. The double-slotted pin with angled lock can be expanded, i.e., deformed, radially, by a central pin to fit tightly within the PCB-interconnect aperture 207, which can be a through-aperture. Then, the elements can be pressed in the axial direction on the angled surface of the pin 64 causing the angled pin to deform, thereby locking itself in place and providing a secure electrical connection between the PCB 200 and the battery-pack interconnect 66.

Figure 8A:
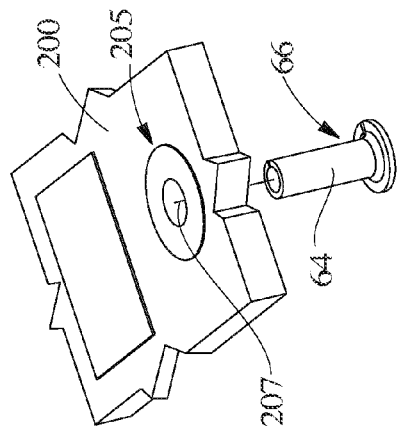
FIG. 8A is a perspective schematic view an embodiment of the battery-pack interconnect comprising a solid pin and a spring nut in conjunction with a portion of the PCB.
Figure 8B:
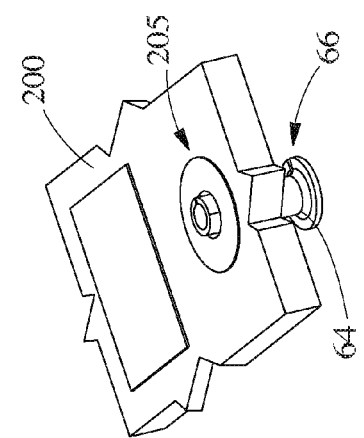
FIG. 8B is a perspective schematic view of the embodiment shown in FIG. 8A, showing the battery-pack interconnect disposed in the PCB interconnect to provide direct electrical connection therebetween.

FIG. 8A shows an embodiment of the battery-pack interconnect 66 comprising a solid pin 64 having a spring nut 64a, in conjunction with a portion of the PCB 200; and FIG. 8B shows the embodiment shown in FIG. 8A, wherein the battery-pack interconnect 66 disposed in the PCB interconnect 205 to provide direct electrical connection therebetween. The protruding pin 64 can be inserted into the spring nut 64a and pressed in contact with the PCB 200 to provide a secure electrical contact between the PCB 200 and the battery-pack interconnect 66.

Figure 9A:
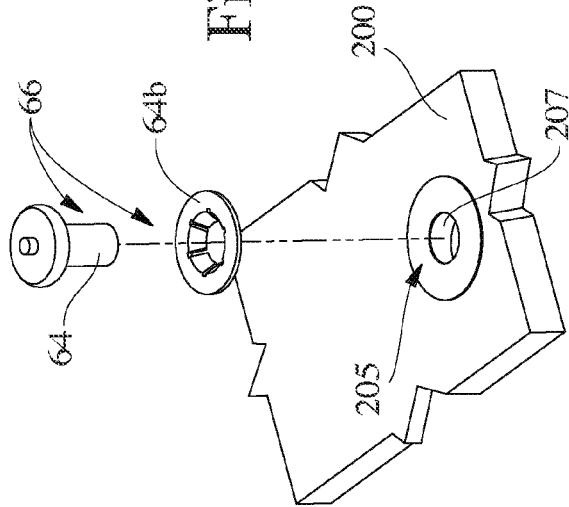
FIG. 9A is a perspective schematic view an embodiment of the battery-pack interconnect comprising a solid pin and a spring nut in conjunction with a portion of the PCB including an embodiment of the PCB-interconnect comprising a blind aperture.
Figure 9B:
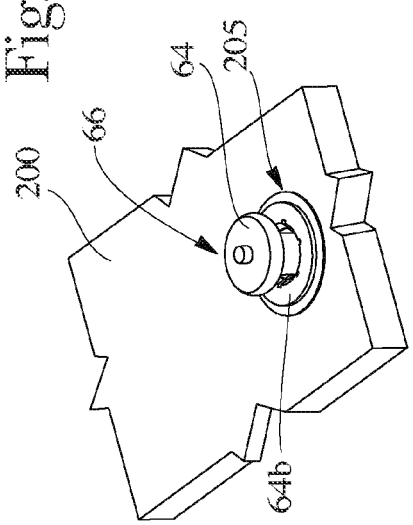
FIG. 9B is a perspective schematic view of the embodiment shown in FIG. 9A, showing the battery-pack interconnect disposed in the PCB interconnect to provide direct electrical connection therebetween.

FIG. 9A shows an embodiment of the battery-pack interconnect comprising a solid pin 64 and a second spring nut 64b, in conjunction with a portion of the PCB 200 including an embodiment of the PCB-interconnect 205 comprising the PCB-interconnect aperture 207; and FIG. 9B shows the embodiment shown in FIG. 9A, wherein the battery-pack interconnect 66 is disposed in the PCB interconnect 205 to provide direct electrical connection therebetween. The PCB-interconnect aperture 207 can be a blind (i.e., one-sided) aperture. The second spring nut 64b can be affixed to the PCB surface by, for example, soldering). When the pin 64 is inserted into the second spring nut 64b and the aperture 207 and pressed to lock therewith, a secure electrical contact can be established between the PCB 200 and the battery-pack interconnect 66.

Figure 10A:
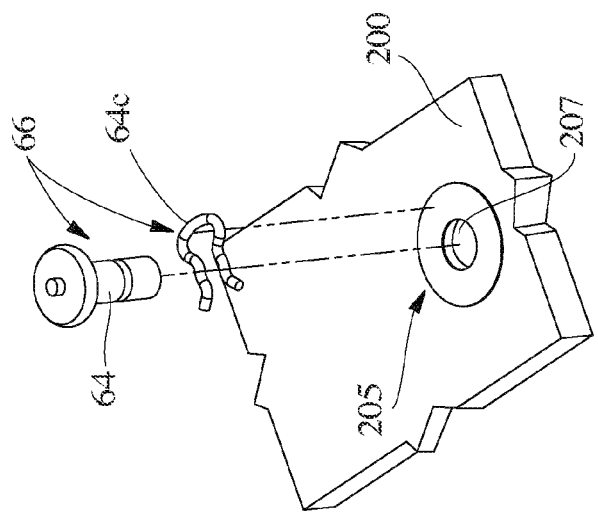
FIG. 10A is a perspective schematic view an embodiment of the battery-pack interconnect comprising a grooved pin and a spring clip in conjunction with a portion of the PCB including an embodiment of the PCB-interconnect comprising a blind aperture.
Figure 10B:
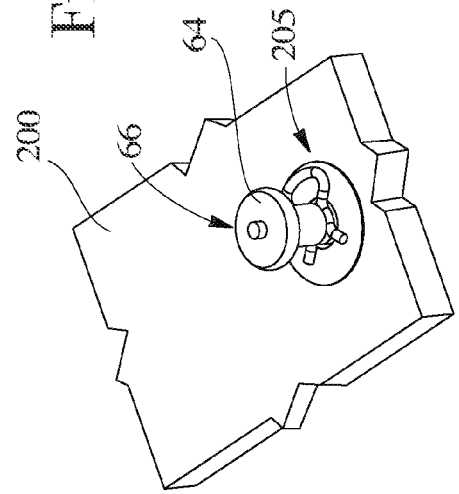
FIG. 10B is a perspective schematic view of the embodiment shown in FIG. 10A, showing the battery-pack interconnect disposed in the PCB interconnect to provide direct electrical connection therebetween.

FIG. 10A shows an embodiment of the battery-pack interconnect 66 comprising a grooved pin 64 and a spring clip 64c, in conjunction with a portion of the PCB 200 including an embodiment of the PCB-interconnect 205 comprising the PCB-interconnect aperture 207; and FIG. 10B shows the embodiment shown in FIG. 10A, wherein the battery-pack interconnect 66 is disposed in the PCB interconnect 205 to provide direct electrical connection therebetween. The PCB-interconnect aperture 207 can be blind. The spring clip 64c can be affixed to the PCB 200 by, for example, soldering. When the grooved pin 64 is inserted into the aperture 207 and pressed so that the spring clip 64c snaps into the pin's groove, a secure electrical contact can be established between the PCB 200 and the battery-pack interconnect 66.

Figure 11A:
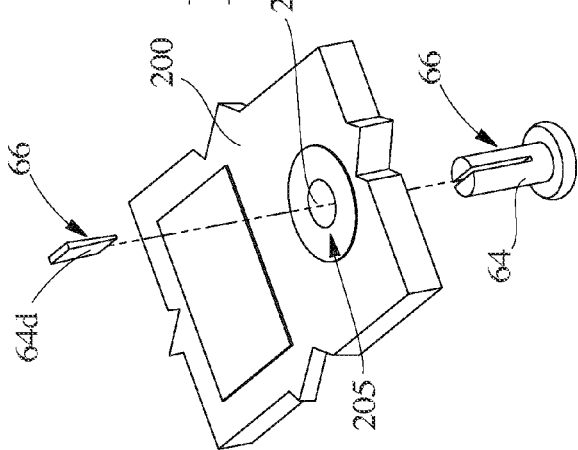
FIG. 11A is a perspective schematic view an embodiment of the battery-pack interconnect comprising a radially expanding slotted pin and a wedge in conjunction with a portion of the PCB including an embodiment of the PCB-interconnect comprising a blind aperture.
Figure 11B:
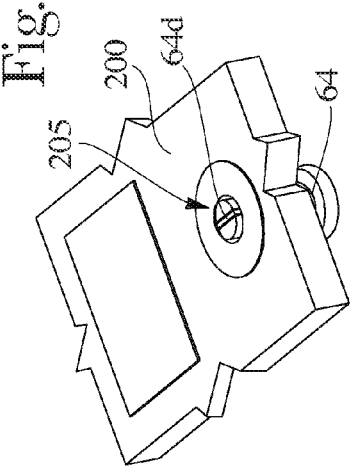
FIG. 11B is a perspective schematic view of the embodiment shown in FIG. 11A, showing the battery-pack interconnect disposed in the PCB interconnect to provide direct electrical connection therebetween.

FIG. 11A shows an embodiment of the battery-pack interconnect 66 comprising a radially expanding slotted pin 66 and a wedge 64d, in conjunction with a portion of the PCB 200 including an embodiment of the PCB-interconnect 205 comprising a through aperture 207; and FIG. 11B shows the embodiment shown in FIG. 11A, wherein the battery-pack interconnect 66 is disposed in the PCB interconnect 205 to provide direct electrical connection therebetween.

Figure 12A:
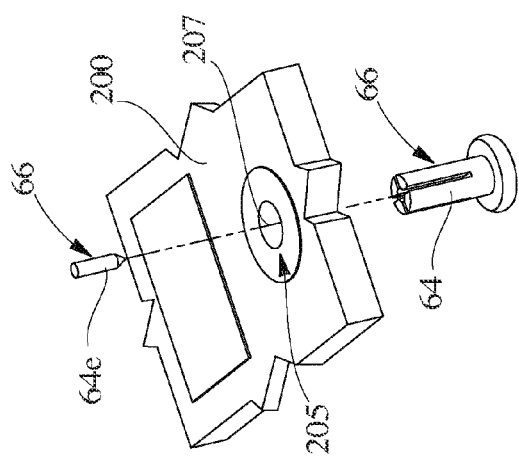
FIG. 12A is a perspective schematic view an embodiment of the battery-pack interconnect comprising a radially expanding double-slotted pin and a mandrel in conjunction with a portion of the PCB including an embodiment of the PCB-interconnect comprising a blind aperture.
Figure 12B:
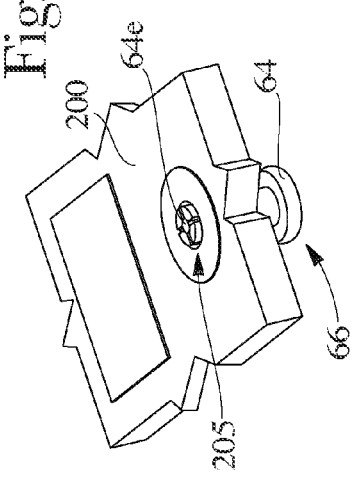
FIG. 12B is a perspective schematic view of the embodiment shown in FIG. 12A, showing the battery-pack interconnect disposed in the PCB interconnect to provide direct electrical connection therebetween.

FIG. 12A shows an embodiment of the battery-pack interconnect comprising a radially expanding double-slotted pin 64 and a mandrel 64e, in conjunction with a portion of the PCB 200 including an embodiment of the PCB interconnect 205 comprising a blind aperture; and FIG. 12B shows the embodiment shown in FIG. 12A, wherein the battery-pack interconnect 66 is disposed in the PCB interconnect 205 to provide direct electrical connection therebetween.

The pin 64 may be forged with the cell contact 60 to form an integral, or single-structured battery-pack interconnect, which is believed to provide an even lower electrical resistance compared to that of a structure in which the pin 64 is connected to the cell contact 60 via welding, soldering, adhering with conductive glue, and the like, i.e., where they form two separate assemblies. In addition, the single-structured battery-pack interconnect may also reduce the number of steps that are required during cell assembly, for example, by eliminating at least one process step, such as the welding, soldering, or the like to fix the pin 64 to the cell contact 60.

The terms "single structure," "integral structure" and permutations thereof are used herein to refer to a structure that cannot be divided into separate elements without compromising the integrity of the entire structure. A single or integral structure can be formed, for example, by a stamping process, extrusion process, molding process, and the like, wherein the structure is created substantially by the above-exemplified process, without a step of combining two or more separate elements into a single structure. Alternatively, the battery-pack interconnect may comprise a composite structure, i.e., a structure formed by two or more elements connected to one another by mechanical fastening or welding, soldering, and the like.

The printed circuit board (PCB) 200, on or within which a wiring pattern or circuit may be formed, may include a plurality of safety devices, power terminals, external connection terminals, and the like that provide additional functionality. Examples of additional functionality include (RFID) communication, antennas, and thermal heat sinks. The PCB 200 may comprise one or more layers, each having its own wiring pattern. The wiring pattern may comprise conductive traces or conductive foil traces. A multi-layer PCD may comprise vias between layers to provide electrical connection between their wiring patterns. Examples of safety devices may include a protective module, a positive-temperature-coefficient (PTC) thermistor, and the like. The protective module may include, for example, a switching device, a control-circuit unit, a resistor, a capacitor and the like. Examples of power terminals and external-connection terminals may include PCB 200 contact pads, such as, for example, a first contact pad 220, a second contact pad 230, a third contact pad 240, a fourth contact pad 250, and a fifth contact pad 260. In this exemplary embodiment, the contact pads 230 and 250 may be power terminals and the contact pads 220 and 240 may be external connection terminals.

The external connection terminal 220 may be connected to an external electronic device, such as, for example, a digital camera or a battery charger, and may form an electric path through which information pertaining to the battery can flow to the device. The information may include battery type, battery capacity, and any other desirable data. The external connection terminal 240 may also be connected to an external electronic device, such as, for example, a digital camera or a battery charger, and may form an electric path passing to the device additional information pertaining to the battery. The information may include battery temperature, battery voltage, and the like. Contact pad 260 may be used to connect the circuit on or within the PCB 200 to the first electrode 12 via a tab 70 affixed to the contact pad 260 and to the housing 10 or the housing closure 50 (FIGS. 2A and 3A).

The tab 70 may be made of nickel, copper, aluminum, alloys thereof, and the like. The tab 70 may be affixed to the housing closure 50, the housing 10, or a weld plate 70. The tab 70 may be affixed by welding, soldering, adhering with conductive glue, and the like. Examples of welding techniques are listed above. It should be appreciated that the tab 70 should be made of material that is best suited for bonding between the PCB 200 and the housing closure 50, the housing 10, or the weld plate 72. The weld plate 72 may optionally be used to insure a more intimate bond between the housing 10 or housing closure 50 and the tab 70. The weld plate may be made of, for example, nickel, copper, aluminum, alloys thereof, and the like.

The PCB 200 may also include a PCB interconnect 205. As used herein, the term "PCB interconnect" refers to a structure associated with the PCB 200 that is configured to provide a direct electrical connection between the PCB 200 and another member, for example, the battery-pack interconnect 66. As used herein, the terms "electrical contact," "electrical connection," "electrical coupling," and any permutations thereof should not be limited to direct, or immediate electrical connections only, i.e., should not be limited to those connections where one recited element directly contacts or touches another recited element. The term "direct electrical connection" and any permutation thereof, on the other hand, should be interpreted as requiring the above-mentioned direct, or immediate, contact between the two recited elements. For example, the phrase "direct electrical connection between a member A and a member B" means that there is no intermediate member C between the members A and B (excluding, however, soldering alloy, electro-conductive glue, and the like materials that may be used to effectuate a secure direct electrical connection), while the phrase "electrical connection (or coupling) (or contact) between a member A and a member B" should mean that there may or may not be one or more intermediate electrically-conductive elements between the members A and B.

The PCB interconnect 205 may be designed to be an integral part of the PCB 200. In the embodiments shown in FIGS. 1-4A, the PCB interconnect 205 comprises a PCB-interconnect aperture 207 formed in the PCB 200. The PCB shown in FIGS. 2-2B comprises the PCB-interconnect aperture 207 that extends all the way through at least one layer of the PCB 200. However, a "blind" PCB-interconnect aperture 207, i.e., an aperture that does not extend all the way through the PCB 200 (not shown), is also included in the scope of the invention. The PCB-interconnect aperture 207 has an internal surface 270 that is electrically conductive. The electrically conductive surface 270 can be electrically coupled with a circuit or circuits and components of at least one layer of the PCB 200. Any suitable means of forming the conductive surface 270 are within the scope of the invention. For example, the surface 270 can be coated with any suitable conductive material that can be applied to the surface 270 by any suitable means known in the art, for example, using plating, physical vapor deposition, and the like. In an embodiment in which the conductive surface is formed by using a conductive material, the conductive material may comprise any material with suitable plating and conductivity characteristics. Examples of conductive materials include, without limitation, nickel, gold, copper, alloys thereof, and the like. Alternatively or additionally, the conductive surface 270 may comprise a portion of the wiring or circuitry of at least one of the PCB layers.

The battery-pack interconnect 66 on the one hand, and the PCB-interconnect aperture 207 on the other hand, can be sized and shaped so that a secure electrical connection is established between the two when the battery-pack interconnect 66 is inside the aperture 207. This is believed to provide a low-resistance direct electrical connection between the conductive surface 270 and the battery-pack interconnect 66—and consequently between the PCB 200 and the battery 100.

Referring now to FIGS. 3-3B, the PCB 200 may be brought into contact with the battery-pack interconnect 66 by aligning the PCB-interconnect aperture 207 with the battery-pack interconnect 66 and pressing the PCB 200 towards the battery 100. The battery-pack interconnect 66 will then be tightly contacting, by mechanical friction, the conductive surface 270. Additionally or alternatively, the battery-pack interconnect 66 may be affixed to the conductive coating of the surface 270 by welding, soldering, and the like. Examples of welding and soldering techniques include, without limitation, ultrasonic welding, laser welding, fusion welding, electrical resistance welding, laser soldering, and the like.

The tab 70 may be structured to be able to fold, accordion-like, as shown in FIGS. 2A and 3A. When the tab 70 is in its substantially folded configuration, FIG. 3A, the PCB 200 is located in close proximity to the battery 100. The combination of the PCB 200 and the battery 100 may then be incorporated in a common housing (not shown) to create a finished battery pack that may be used to power a portable electronic device.

In the embodiment shown in FIGS. 4-4B, a first-electrode contact pin 68 is in electrical connection with both the PCB 200 and the first electrode 12. The first-electrode contact pin 68 should be made of material that is best suited for bonding between the PCB 200 and the housing closure 50 or the housing 10. Such material may include nickel, copper, aluminum, alloys thereof, and the like. The first-electrode contact pin 68 may be affixed to the housing closure 50 or the housing 10, by welding, soldering, and the like. Examples of welding and soldering techniques include, without limitation, ultrasonic welding, laser welding, fusion welding, electrical resistance welding, laser soldering, and the like.

The PCB 200 interconnect may include more than one interconnect aperture 207. As shown in FIG. 4, for example, two interconnect apertures 207 may be formed in the PCB 200. Then, the PCB 200 may be brought into contact with the cell-contact pin 64 and the first-electrode contact pin 68 by aligning one of the apertures 207 with the cell-contact pin 64 and the other of the apertures 207 with the first-electrode contact pin 68, FIG. 4B. The PCB 200 may then be pressed towards the battery 100. The cell-contact pin 64 and first-electrode contact pin 68 may be affixed to the conductive surface 270 of the PCB-interconnect apertures 207 by mechanical friction, welding, soldering, and the like. As is described above, the split or hollow cell-contact pin 64, in combination with the insertion of a pin or wedge within the hollow or split opening, may improve the connection. Examples of welding and soldering techniques include, without limitation, ultrasonic welding, laser welding, fusion welding, electrical resistance welding, laser soldering, and the like. The PCB 200 will be located in close proximity to the battery 100 in this arrangement. The combination of the PCB 200 and the battery 100 may then be incorporated in a common housing (not shown) to create a finished battery pack that may be used to power a portable electronic device.

The invention disclosed herein is believed to enable rechargeable batteries to have a lower resistance when compared to typical prior-art rechargeable batteries having tab connections between the terminals and the PCB 200. The resistance reduction is believed to result from using less material as well as making more intimate electrical contact between the battery terminals and the PCB 200. Therefore, a battery pack of the present invention is believed to have improved charge and discharge performance as a result of the lower overall resistance, when compared to prior-art battery packs of similar construction. In addition, a battery pack, including the combination of the battery-pack interconnect and the PCB interconnect 205, as described herein, may lead to less complex manufacturing processes resulting in increased production rate and efficiency.

In addition to electrical connection, described herein above, the battery-pack interconnect 66 can be structured and configured to provide structural support for the battery pack. The cell-contact pin 64, securely interconnecting the battery 100 and the PCB 200, can form both the electrical connection between the batter and the PCB and a rigid battery-PCB structure. Such means of attachment as, e.g., soldering, welding, clipping, snapping, wedging or the like, between cell-contact pin 64 and the PCB 200 may provide fixed support for the PCB 200 to prevent movement (or undesirable removal) of the PCB 200, while allowing for mechanical loading of the PCB contact pads 220, 230, 240, 250, and 260.

Figure 13A:
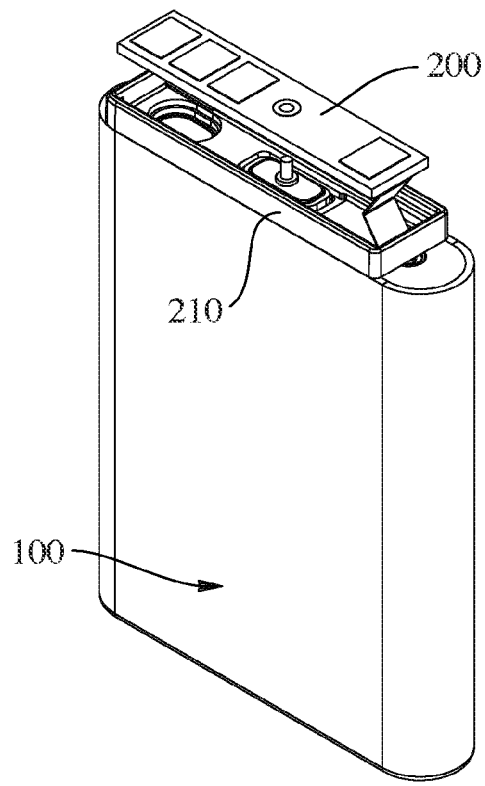
FIG. 13A and FIG. 13B are perspective schematic views of an embodiment of a battery pack of the present invention, comprising a rechargeable battery, a printed circuit board (PCB) supported by an additional PCB support, and a low-resistance battery-pack interconnect.
Figure 13B:
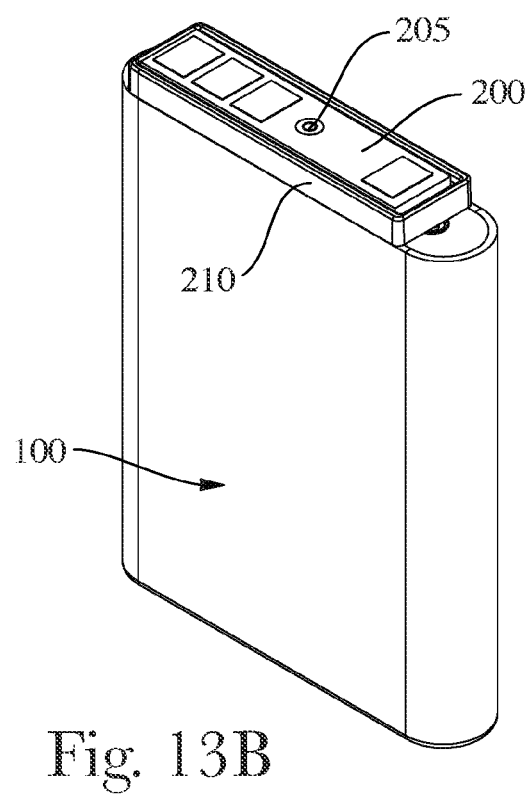
Figure 14:
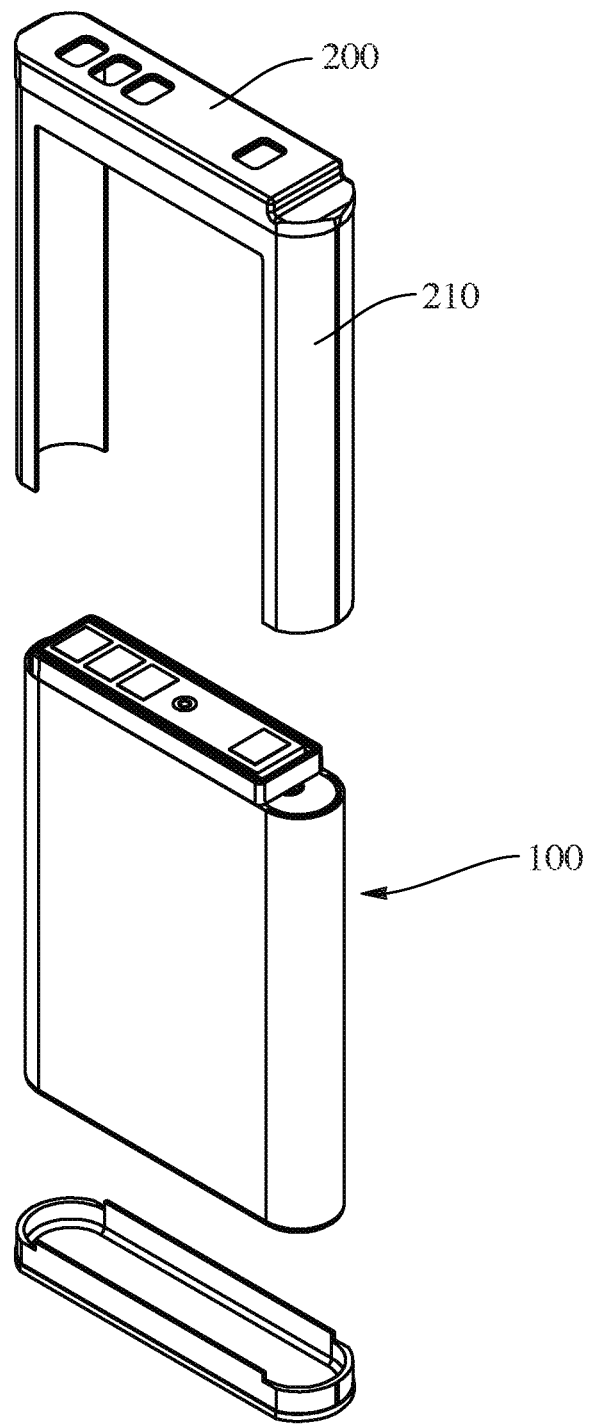
FIG. 14 is a perspective schematic view of an embodiment of a battery pack of the present invention, comprising a rechargeable battery, a printed circuit board (PCB) supported by an additional PCB support, and a low-resistance battery-pack interconnect, wherein the additional PCB support comprises a frame partially encompassing the battery.

An additional PCB support 210 (FIGS. 13A-14) may also be provided to enhance the structural integrity of the battery pack. The support 210 can be designed to provide rigid and secure support of the PCB 200 relative to the battery 100. The support 210 may be interposed, at least partially, between the battery 100 and the PCB 200 (FIGS. 13A and 13B). For example, the support 210 may comprise a plate (not shown) or an open-box-like structure (FIGS. 13A and 13B), or may have any other suitable shape. FIG. 14, e.g., shows the additional PCB support 210 having a generally rectangular configuration and encompassing, at least partially, the battery 100. Such additional PCB support 210, e.g., in the form of a frame, can be structured to provide tight conforming fitting with the battery 100 and to offer firm support for the PCB 200. The additional PCB support 210 may afford more aggressive loading of the PCB 200 in areas not directly supported by the cell-contact pin 64. Also, the additional PCB support 210 can be structured to provide encapsulation of the PSB electronics and the battery terminals to prevent accidental or undesirable access to those. The support 210 can be constructed of a non-conductive material (e.g., non-conductive polymer or ceramic) to ensure electrical isolation between opposite electrical potentials of the battery and the PCB 200.

While particular embodiments of the present invention have been illustrated and described, it would be obvious to a skilled artisan that various other changes and modifications can be made without departing from the spirit and scope of the invention. It is, therefore, intended to cover in the appended claims all such changes and modifications that are within the scope of this invention.

What is claimed is:

1. A battery pack comprising:
at least one battery including at least one electrode and at least one terminal in electrical connection with the at least one electrode;
a printed circuit board (PCB) comprising at least one layer having an electrical circuit in electrical connection with the at least one battery, the PCB including at least one PCB interconnect for electrical connection with the at least one battery; and
at least one battery-pack interconnect in electrical connection with the at least one terminal of the battery and the at least one PCB, the at least one battery-pack interconnect comprises a cell-contact pin electrically coupled to the at least one electrode of the at least one battery;
wherein the at least one PCB interconnect comprises a PCB-interconnect aperture therein, said PCB-interconnect aperture having an electrically conductive inner surface electrically coupled with the at least one layer of the PCB, said PCB-interconnect aperture being structured and configured to receive the at least one battery-pack interconnect therein for a direct electrical connection between the at least one PCB interconnect and the at least one battery-pack interconnect;

the cell-contact pin is structured and configured to be inserted in the PCB-interconnect aperture for the direct electrical connection with the PCB interconnect; and the cell-contact pin is selected from the group consisting of a rivet having an angled lock, a pin in combination with a wedge, a pin in combination with a mandrel, or any combination thereof.

2. The battery pack of claim 1, wherein the direct electrical connection between the at least one PCB interconnect and the at least one battery-pack interconnect is formed by conductive connection selected from the group consisting of mechanical friction, soldering, welding, fusion welding, electrical-resistance welding, laser welding, ultrasonic welding, conductive gluing, and any combination thereof.

3. The battery pack of claim 1, wherein the at least one battery-pack interconnect comprises a material selected from the group consisting of nickel, nickel-plated steel, copper, copper-plated steel, aluminum, aluminum-plated steel, and any mixture thereof.

4. The battery pack of claim 1, wherein the at least one battery-pack interconnect is affixed to the at least one terminal of the battery by soldering, welding, fusion welding, electrical resistance welding, laser welding, ultrasonic welding, or conductive glue.

5. The battery pack of claim 4, wherein the at least one terminal comprises a cell contact in electrical connection with a cell-contact plate, wherein the cell-contact plate is in electrical connection with the at least one electrode of the battery, and wherein the cell-contact pin is affixed to the cell contact.

6. The battery pack of claim 1, wherein the at least one battery-pack interconnect comprises a single integral structure.

7. The battery pack of claim 1, wherein the at least one PCB has a plurality of PCB interconnects.

8. The battery pack of claim 7, wherein the plurality of PCB interconnects comprises at least two PCB-interconnect apertures disposed in the at least one PCB.

9. The battery pack of claim 7, wherein the at least one battery-pack interconnect comprises a plurality of battery-pack interconnects in the direct electrical connection with the plurality of PCB interconnects.

10. The battery pack of claim 1, wherein the PCB-interconnect aperture is a through-aperture.

11. The battery pack of claim 1, wherein the PCB-interconnect aperture is a blind aperture.

12. The battery pack of claim 1, wherein the at least one battery-pack interconnect provides structural support for the PCB.

13. The battery pack of claim 1, further comprising an additional PCB support.

14. The battery pack of claim 13, wherein the additional PCB support is at least partially interposed between the PCB and the at least one battery.

15. The battery pack of claim 13, wherein the additional PCB support at least partially encompasses the at least one battery.

16. The battery pack of claim 13, wherein the additional PCB support is made of non-conductive material to provide electrical isolation between the PCB and the at least one battery.

17. A battery pack comprising:
a battery including an electrode assembly comprising an electrolyte, a positive electrode, a negative electrode, and a separator between the positive electrode and the negative electrode, the battery further comprising a positive terminal in electrical connection with the positive electrode, and a negative terminal in electrical connection with the negative electrode;
a printed circuit board (PCB) comprising at least one layer having an electrical circuit in electrical connection with at least one of the electrodes, the PCB including at least one PCB interconnect; and
at least one battery-pack interconnect in electrical connection with the at least one PCB interconnect and at least one of the electrodes,
wherein the at least one battery-pack interconnect comprises a cell-contact pin and the at least one PCB interconnect comprises a PCB-interconnect aperture having an electrically conductive inner surface and configured to receive therein the cell-contact pin for a direct electrical connection between said pin and said surface, thereby providing electrical connection between the at least one battery and the PCB; and
the cell-contact pin is selected from the group consisting of a rivet having an angled lock, a pin in combination with a wedge, a pin in combination with a mandrel, or any combination thereof.

18. The battery pack of claim 17, wherein the electrically conductive inner surface of the PCB-interconnect aperture is electrically coupled to the at least one layer of the PCB.

19. The battery pack of claim 17, wherein the direct electrical connection between the cell-contact pin of the battery-pack interconnect and the electrically conductive inner surface of the PCB-interconnect aperture is formed, at least partially, by conductive connection selected from the group consisting of mechanical friction, soldering, welding, fusion welding, electrical-resistance welding, laser welding, ultrasonic welding, conductive gluing, and any combination thereof.

20. The battery pack of claim 17, wherein the electrically conductive inner surface of the PCB-interconnect aperture comprises a conductive material selected from the group consisting of nickel, gold, copper, conductive alloys, and any combination thereof.

* * * * *